United States Patent
Ooshima et al.

(10) Patent No.: US 12,454,063 B2
(45) Date of Patent: Oct. 28, 2025

(54) ROBOT CONTROL SYSTEM

(71) Applicant: FANUC CORPORATION, Yamanashi (JP)

(72) Inventors: Nao Ooshima, Yamanashi (JP); Gou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 225 days.

(21) Appl. No.: 18/009,146

(22) PCT Filed: Jul. 19, 2021

(86) PCT No.: PCT/JP2021/026955
§ 371 (c)(1),
(2) Date: Dec. 8, 2022

(87) PCT Pub. No.: WO2022/019263
PCT Pub. Date: Jan. 27, 2022

(65) Prior Publication Data
US 2023/0249358 A1 Aug. 10, 2023

(30) Foreign Application Priority Data
Jul. 22, 2020 (JP) ................................. 2020-125422

(51) Int. Cl.
*B25J 13/06* (2006.01)
(52) U.S. Cl.
CPC ..................................... *B25J 13/06* (2013.01)
(58) Field of Classification Search
CPC ........ B25J 13/06; B25J 9/1656; B25J 9/0096; B25J 9/1602; B25J 9/161; B25J 9/1628;
(Continued)

(56) References Cited

U.S. PATENT DOCUMENTS

| | | | |
|---|---|---|---|
| 2017/0057083 A1* | 3/2017 | Maeda | ...................... B25J 9/161 |
| 2017/0139397 A1* | 5/2017 | Kawai | .................. G05B 19/409 |

(Continued)

FOREIGN PATENT DOCUMENTS

| | | |
|---|---|---|
| CN | 101898318 A | 12/2010 |
| JP | 2005-173849 A | 6/2005 |

(Continued)

OTHER PUBLICATIONS

International Search Report and Written Opinion issued on Oct. 19, 2021, in corresponding International Application No. PCT/JP2021/026955, 12 pages.

*Primary Examiner* — Abby Lin
*Assistant Examiner* — Esvinder Singh
(74) *Attorney, Agent, or Firm* — Maier & Maier, PLLC

(57) ABSTRACT

A robot control system including a robot controller configured to control a robot, two operation devices configured to manually operate the robot, the first operation device being connected to the robot controller. Each of the operation devices has a request switch configured to switch between a request state in which an operation right for the robot is requested and a non-request state in which the operation right is not requested, and the robot controller is configured to start providing the operation right to one of the operation devices only when the request switch of the one of the operation devices is in the request state and the request switch of the other of the operation devices is in the non-request state, and keep the operation right granted until the request switch of the one of the operation devices is switched to the non-request state.

5 Claims, 5 Drawing Sheets

(58) Field of Classification Search
CPC .................. B25J 9/163; B25J 11/007; G05B
2219/36162; G05B 19/409; G05B
2219/39443; G05B 2219/39448; G05B
19/41825; G05B 2219/1155; G05B
2219/35454; G05B 2219/23099; G05B
2219/25097; G05B 2219/34456; Y02P
90/02

See application file for complete search history.

(56) References Cited

U.S. PATENT DOCUMENTS

| | | | | |
|---|---|---|---|---|
| 2018/0281172 | A1* | 10/2018 | Inaba | B25J 19/06 |
| 2021/0247763 | A1* | 8/2021 | Kasai | G05D 1/0221 |
| 2022/0011754 | A1* | 1/2022 | Sagasaki | B25J 9/1658 |
| 2022/0388156 | A1* | 12/2022 | Hansen | B25J 13/085 |

FOREIGN PATENT DOCUMENTS

| | | |
|---|---|---|
| JP | 2007-152541 A | 6/2007 |
| JP | 2013-202732 A | 10/2013 |
| JP | 2014-038540 A | 2/2014 |
| JP | 2018083259 A | 5/2018 |
| JP | 2018-171682 A | 11/2018 |

* cited by examiner

ROBOT CONTROL SYSTEM

TECHNICAL FIELD

The present disclosure relates to a robot control system.

BACKGROUND

Conventionally, there is a known operation device that is connected to a controller of an industrial machine such as a machine tool or a robot and that is configured to manually operate the industrial machine (for example, see International Publication No. 2015/190193, Japanese Unexamined Patent Application, Publication No. 2014-038540, Japanese Unexamined Patent Application, Publication No. 2013-202732, and Japanese Unexamined Patent Application, Publication No. 2007-152541). International Publication No. 2015/190193 and Japanese Unexamined Patent Application, Publication No. 2014-038540 disclose a rotary dial-type operation device for a machine tool, and Japanese Unexamined Patent Application, Publication No. 2013-202732 and Japanese Unexamined Patent Application, Publication No. 2007-152541 disclose a teaching pendant for a robot.

DETAILED DESCRIPTION OF THE EMBODIMENTS

In general, a robot controller is equipped with a teaching pendant. When another operation device, for example, a rotary dial-type operation device, is added to the robot controller, a situation may arise in which two operators respectively using two operation devices are simultaneously operating the same robot.

An aspect of the present disclosure is a robot control system including a robot controller configured to control a robot; a first operation device configured to manually operate the robot, the first operation device being connected to the robot controller; and a second operation device configured to manually operate the robot, the second operation device being connected to the robot controller, wherein each of the first operation device and the second operation device has a request switch configured to switch between a request state in which an operation right for the robot is requested and a non-request state in which the operation right is not requested, and the robot controller is configured to: start providing the operation right to one of the first operation device and the second operation device only when the request switch of the one of the operation devices is in the request state and the request switch of the other of the operation devices is in the non-request state, allow the one of the operation devices that is granted the operation right to operate the robot and forbids the other of the operation devices from operating the robot while the operation right remains granted to the one of the operation devices, and keep the operation right granted until the request switch of the one of the operation devices is switched to the non-request state.

A robot control system according to an embodiment will now be described with reference to the drawings.

Figure 1:
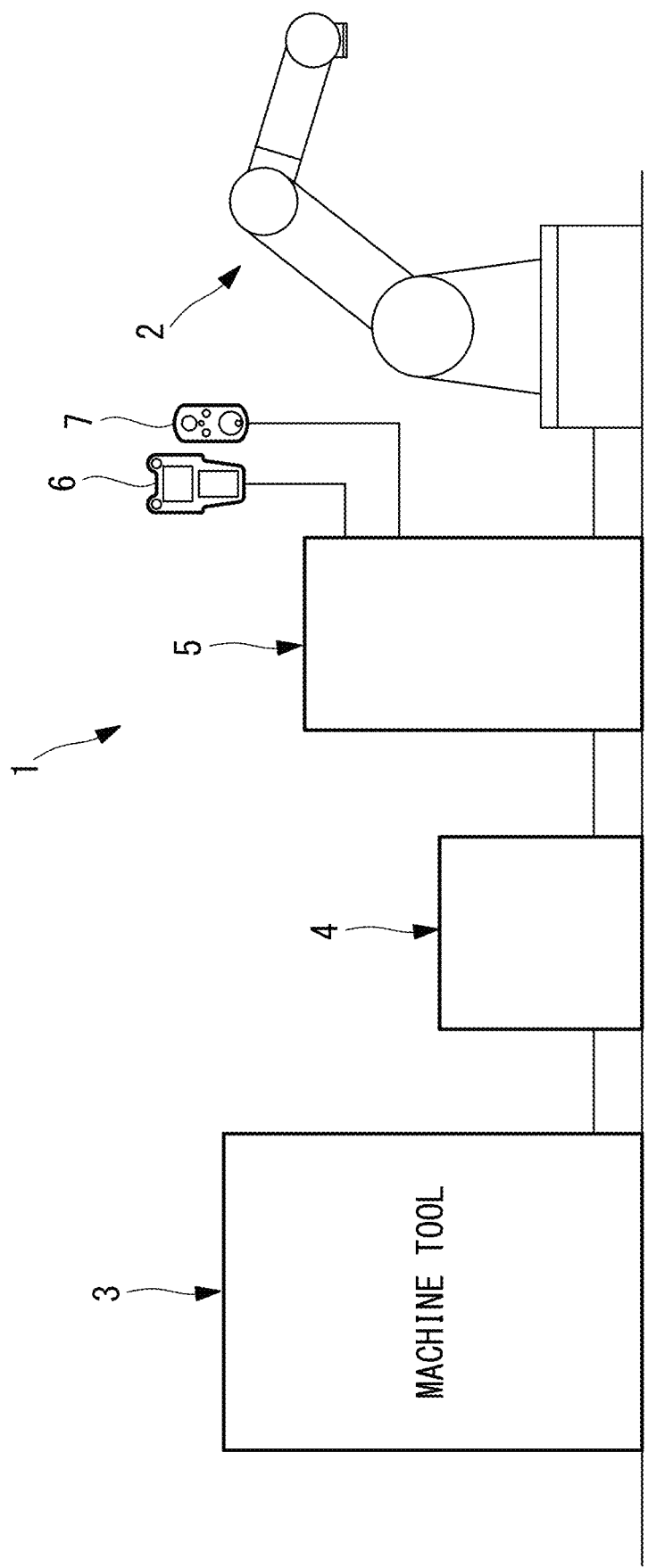
FIG. 1 is an overall structural diagram of a system equipped with a robot, a machine tool, a machine tool controller, and a robot control system.
Figure 2:
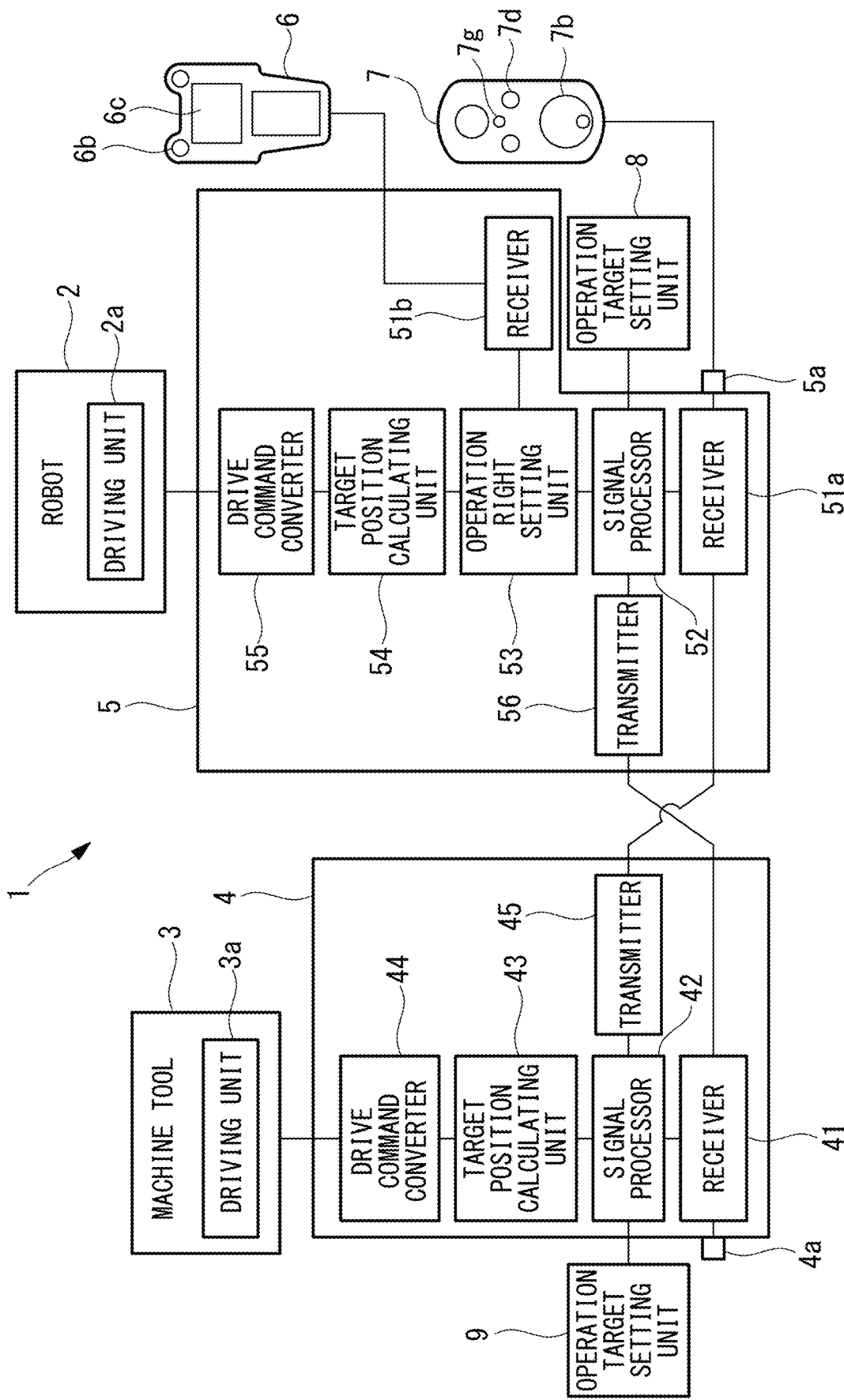
FIG. 2 is a block diagram of a system according to one implementation example.

As illustrated in FIGS. 1 and 2, a robot control system 1 is a part of a control system that controls a robot 2 and a machine tool 3 that work in cooperation with each other. The control system includes a machine tool controller 4 that controls the machine tool 3, and the robot control system 1. The robot control system 1 includes a robot controller 5 that controls the robot 2, and two operation devices 6 and 7 for manually operating the robot 2 or the machine tool 3.

The robot 2 is located outside the machine tool 3, and is an industrial robot of a desired type that is actuated by a driving unit 2a to perform tasks. For example, the robot 2 is a vertical articulated robot, and the driving unit 2a is a servo motor installed in a joint. For example, the robot 2 feeds a workpiece to the machine tool 3 and takes out the workpiece from the machine tool 3. The machine tool 3 processes the workpiece by actuating a driving unit 3a. The driving unit 3a includes, for example, a rotary motor that rotates the tool, and a feed motor that moves the tool and the workpiece relative to each other.

Two controllers 4 and 5 are connected via a communication network such as Ethernet (registered trademark) so that they can communicate with each other, and exchange signals through a communication protocol such as FL-net.

The first operation device 6 is a portable robot operation panel that can operate the robot 2 only, and is connected to the robot controller 5.

The second operation device 7 is a portable rotary dial-type operation device that can operate the robot 2 and the machine tool 3. The controllers 4 and 5 respectively have connectors 4a and 5a for the rotary dial-type operation device 7, and the rotary dial-type operation device 7 is connected to one of two controllers 4 and 5. In other words, the rotary dial-type operation device 7 is either directly connected to the robot controller 5 or is indirectly connected to the robot controller 5 via the machine tool controller 4 and the communication network.

The control system further includes operation target setting units 8 and 9 that set the operation target of the rotary dial-type operation device 7. The operation target setting units 8 and 9 are operated by the operator, and set the operation target to either the robot 2 or the machine tool 3 according to the operation performed by the operator.

Examples of the operation target setting units 8 and 9 include touch buttons displayed on setting screens of operation panels of the controllers 4 and 5, and hardware keys installed on the operation panels. The operation target setting unit 8 may be installed in the robot operation panel 6. Other examples of the operation target setting units 8 and 9 include external devices connected to the controllers 4 and 5, for example, sequencers (programmable logic controllers or PLCs) or switches, and a signal indicating the set operation target may be externally input from an external device to the controllers 4 and 5.

The operation target is set by one of the two operation target setting units 8 and 9. For example, when the rotary dial-type operation device 7 is connected to the robot controller 5, only the operation target setting unit 8 on the robot controller 5-side functions, and when the rotary dial-type operation device 7 is connected to the machine tool controller 4, only the operation target setting unit 9 on the machine tool controller 4-side functions.

Figure 3:
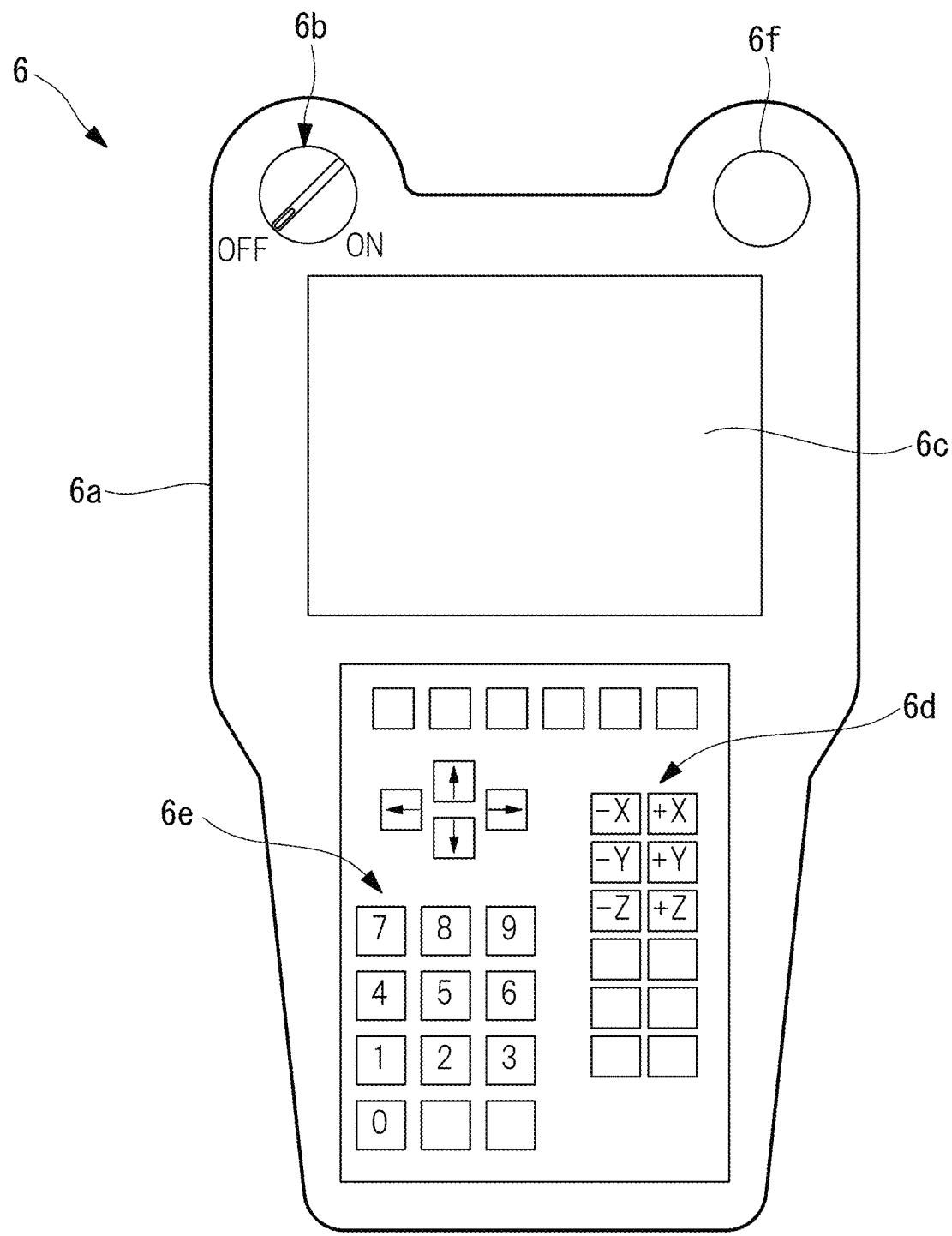
FIG. 3 is a front view of a robot operation panel.

As illustrated in FIG. 3, the robot operation panel 6 includes a casing 6a to be held by a hand of the operator, and a request switch 6b provided on the casing 6a. The request switch 6b can switch a request state in which the operation right to operate the robot 2 is requested to a non-request state in which the operation right is not requested and vise versa. For example, the request state is entered by turning the request switch 6b ON, and the non-request state is entered by turning the request switch 6b OFF. The casing 6a also has an operation screen 6c, operation keys 6d, number keys 6e, an emergency stop switch 6f, an enable switch (not illustrated), etc. Only when the enable switch is depressed, the operation of the operation target through the robot operation panel 6 is enabled. The robot operation panel 6 generates operation signals that indicate the states of the switches 6b and 6f, operation of the keys 6d and 6e, etc., and inputs the operation signals to the robot controller 5.

Figure 4:
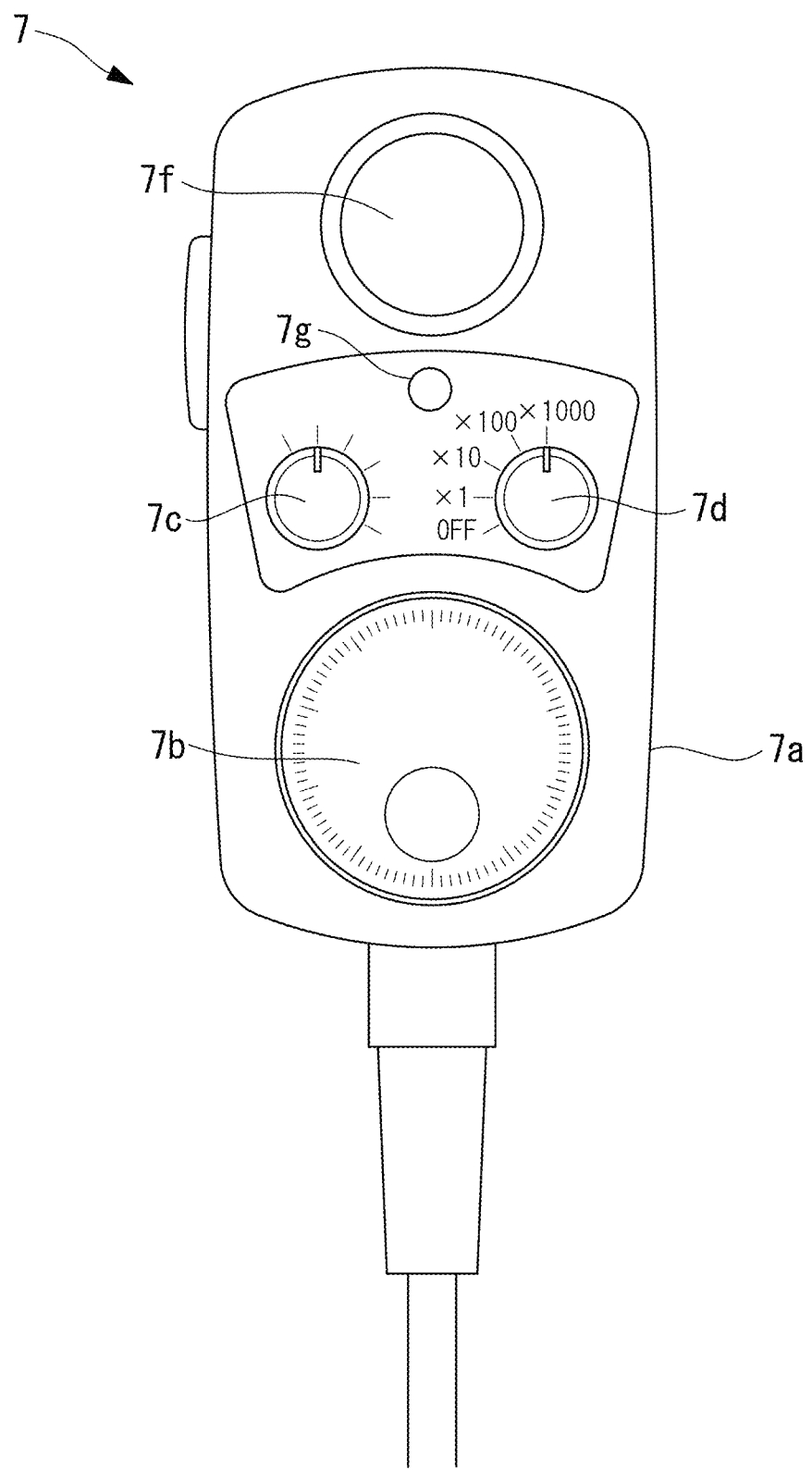
FIG. 4 is a front view of a rotary dial-type operation device.
Figure 5:
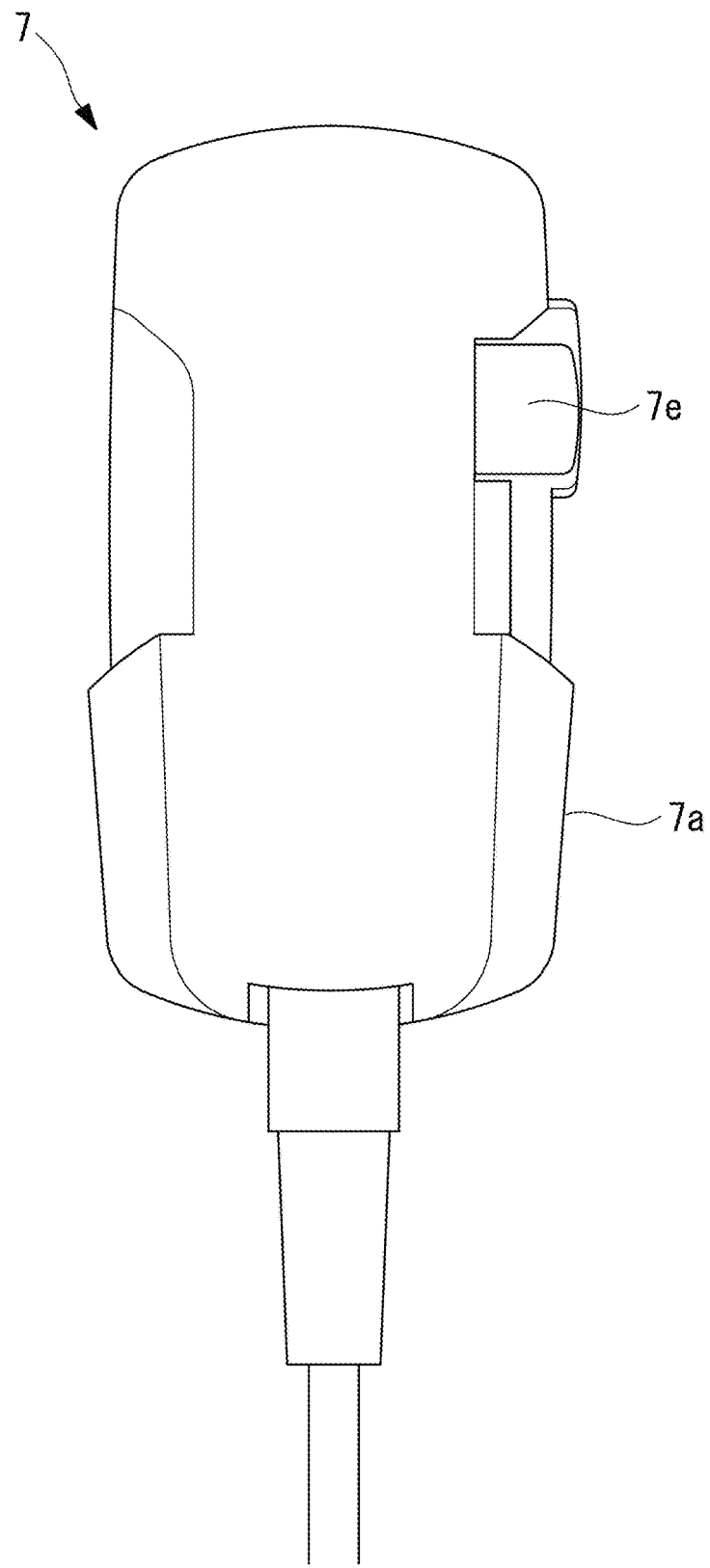
FIG. 5 is a rear view of the rotary dial-type operation device.

As illustrated in FIGS. 4 and 5, the rotary dial-type operation device 7 is equipped with a casing 7a to be held with a hand of the operator, and a pulse handle 7b and switches 7c, 7d, 7e, and 7f provided on the casing 7a.

The pulse handle 7b can be rotated in both directions and is a rotary dial to be rotated and operated by the operator. The rotary dial-type operation device 7 is a manual pulse generator, and generates pulses that correspond to the rotation amount and direction of the pulse handle 7b from a pulse generator unit (not illustrated) provided inside the casing 7a. The larger the rotation amount, the larger the number of generated pulses. The movement of a particular operation region of the robot 2 or the machine tool 3 is controlled according to the pulses, and the amount, speed, and direction of movement of the operation region are respectively designated by the amount, speed, and direction of the rotation of the pulse handle 7b. The operation region of the machine tool 3 is, for example, a tip of a tool, and the operation region of the robot 2 is, for example, a tip of a tool connected to a tip of an arm.

The axis selection switch 7c switches the axis of the operation region to be moved among multiple axes. In one example, the axis can be switched among a total of six axes, i.e., three linear motion axes and three rotary axes respectively orthogonal to the three linear motion axes. The operation region moves in a direction along the selected linear motion axis, or rotates about the selected rotary axis.

The multiplying factor selection switch 7d is a switch that changes the multiplying factor for the amount, per pulse, of movement of the operation region. In one example, the multiplying factor can be switched among OFF (in other words, a factor of zero), multiplying by one, multiplying by 10, multiplying by 100, and multiplying by 1000. The pulses generated by the rotation of the pulse handle 7b are multiplied by the multiplying factor set by the multiplying factor selection switch 7d. Thus, the larger the multiplying factor, the larger the amount of movement of the operation region per unit rotation amount of the pulse handle 7b. When the multiplying factor is set to OFF, the operation target cannot be operated even when the pulse handle 7b is rotated.

The multiplying factor selection switch 7d is also a request switch that can switch between a request state in which the operation right is requested and a non-request state in which the operation right is not requested. In other words, the non-request state is entered when the multiplying factor selection switch 7d is OFF, and the request state is entered when the multiplying factor is anything but OFF.

The enable switch 7e is used to switch enabling to disabling and vise versa in the operation of the operation target by the rotary dial-type operation device 7. The enable switch 7e is a push-button-type switch such as three-position switch, and is at a position where the hand holding the casing 7a can depress. Only when the enable switch 7e is depressed, the operation of the operation target by the rotary dial-type operation device 7 is enabled.

The emergency stop switch 7f generates an emergency stop signal that causes the operation target to stop.

The rotary dial-type operation device 7 generates operation signals that include pulses generated by the rotation of the pulse handle 7b and the signals indicating the states of the switches 7c, 7d, 7e, and 7f, and inputs the operation signals to the controller 4 or 5 connected to the rotary dial-type operation device 7.

As illustrated in FIG. 2, the robot controller 5 is equipped with receivers 51a and 51b, a signal processor 52, an operation right setting unit 53, a target position calculating unit 54, a drive command converter 55, and a transmitter 56. The robot controller 5 is also equipped with a processor and a memory, and the signal processor 52, the operation right setting unit 53, the target position calculating unit 54, and the drive command converter 55 are run by the processor.

The signal processor 52 receives operation signals from the rotary dial-type operation device 7 via the connector 5a and the receiver 51a, receives information on the operation target set from the operation target setting unit 8, and forwards the operation signals to one of the operation right setting unit 53 and the transmitter 56 according to the set operation target. Specifically, when the operation target is set to the robot 2, the signal processor 52 forwards the operation signals to the operation right setting unit 53, and when the operation target is set to the machine tool 3, the signal processor 52 forwards the operation signals to the transmitter 56. The transmitter 56 transmits the forwarded operation signals to the receiver 41 of the machine tool controller 4 every predetermined period via the communication network.

In addition, the signal processor 52 receives operation signals from the machine tool controller 4 via the receiver 51a, and forwards the operation signals to the operation right setting unit 53.

The operation right setting unit 53 receives operation signals from the robot operation panel 6 via the receiver 51b, and receives operation signals of the rotary dial-type operation device 7 from the signal processor 52. The operation signals include a signal which indicates the state of the request switch 6b or 7d. The operation right setting unit 53 provides the operation right to operate the robot 2 to one of the robot operation panel 6 and the rotary dial-type operation device 7 on the basis of the states of the two request switches 6b and 7d, and switches the operation right between the robot operation panel 6 and the rotary dial-type operation device 7 according to the change in the states of the request switches 6b and 7d.

Specifically, the operation right setting unit 53 starts providing the operation right to the robot operation panel 6 only when the request switch 6b is in a request state and the request switch 7d is in a non-request state. Moreover, the operation right setting unit 53 starts providing the operation right to the rotary dial-type operation device 7 only when the request switch 6b is in a non-request state and the request switch 7d is in a request state.

While the operation right is provided to one of the robot operation panel 6 and the rotary dial-type operation device 7, the operation right setting unit 53 allows said one that is granted the operation right to operate the robot 2 and forbids the other from operating the robot 2. For example, the operation right setting unit 53 accepts operation signals from only one of the robot operation panel 6 and the rotary dial-type operation device 7 to which the operation right is provided, and the accepted operation signals are transmitted to the target position calculating unit 54.

Once the operation right setting unit 53 provides the operation right to one of the operation devices 6 and 7, the operation right setting unit 53 keeps providing the operation right to said one operation device until the request switch of said one operation device is switched to a non-request state irrespective of the change in the state of the request switch of the other of the operation devices 6 and 7. In other words, even when the request switch 7*d* is switched to a request state during the period when the operation right is provided to the robot operation panel 6, the operation right does not shift to the rotary dial-type operation device 7 but remains with the robot operation panel 6; thus, the robot operation panel 6 is allowed to continue operation of the robot 2. In the same manner, even when the request switch 6*b* is switched to a request state during the period when the operation right is provided to the rotary dial-type operation device 7, the operation right does not shift to the robot operation panel 6 but remains in the rotary dial-type operation device 7; thus, the rotary dial-type operation device 7 is allowed to continue operating the robot 2.

The target position calculating unit 54 calculates the target position of the operation region of the robot 2 on the basis of operation signals. Specifically, the amount of movement of the operation region of the robot 2 per pulse is preliminarily set for each of the axes. The target position calculating unit 54 samples the number of pulses, which had been generated by the pulse generator unit, every predetermined period of time, and multiplies the sampled number of pulses by the multiplying factor set by the multiplying factor selection switch 7*d* so as to calculate the number of pulses. The target position calculating unit 54 calculates the target position that is reached when the operation region is moved from the current position along the linear motion axis or about the rotation axis selected by the axis selection switch 7*c* by an amount of movement corresponding to the calculated number of pulses.

The drive command converter 55 calculates, on the basis of the target position calculated by the target position calculating unit 54, a drive command signal for moving the operation region to the target position by the driving unit 2*a*, and transmits the drive command signal to the driving unit 2*a*. As the driving unit 2*a* moves according to the drive command signal, the operation region moves to the target position along the selected linear motion axis or about the selected rotation axis according to the amount and direction of rotation of the pulse handle 7*b*.

As illustrated in FIG. 2, the machine tool controller 4 is equipped with a receiver 41, a signal processor 42, a target position calculating unit 43, a drive command converter 44, and a transmitter 45. The machine tool controller 4 is equipped with a processor and a storage unit, and the signal processor 42, the target position calculating unit 43, and the drive command converter 44 are run by the processor.

The signal processor 42 receives operation signals from the rotary dial-type operation device 7 via the connector 4*a* and the receiver 41, and forwards the received operation signals to one of the target position calculating unit 43 and the transmitter 45 depending on the operation target set by the operation target setting unit 9. Specifically, when the operation target is set to the machine tool 3, the signal processor 42 forwards the operation signals to the target position calculating unit 43, and when the operation target is set to the robot 2, the signal processor 42 forwards the operation signals to the transmitter 45. The transmitter 45 is connected to the receiver 51*a* of the robot controller 5 via the communication network, and transmits the forwarded operation signals to the receiver 51*a* every predetermined period.

In addition, the signal processor 42 forwards operation signals, which have been received from the robot controller 5 via the receiver 41, to the target position calculating unit 43.

The target position calculating unit 43 calculates the target position of the operation region of the machine tool 3 on the basis of the operation signals. Specifically, the amount of movement of the operation region of the machine tool 3 per pulse is preliminarily set for each axis. The target position calculating unit 43 samples the number of pulses, which had been generated by the pulse generator unit, every predetermined period of time, and multiplies the sampled number of pulses by the multiplying factor set by the multiplying factor selection switch 7*d* to calculate the number of pulses. The target position calculating unit 43 calculates the target position that is reached when the operation region is moved from the current position along the linear motion axis or about the rotation axis selected by the axis selection switch 7*c* by an amount of movement corresponding to the calculated number of pulses.

The drive command converter 44 calculates, on the basis of the target position calculated by the target position calculating unit 43, a drive command signal for moving the operation region to the target position by the driving unit 3*a*, and transmits the drive command signal to the driving unit 3*a*. As the driving unit 3*a* is actuated according to the drive command signal, the operation region moves to the target position along the selected linear motion axis or about the selected rotation axis according to the amount and direction of rotation of the pulse handle 7*b*.

Next, the actions of the robot control system 1 and the control system are described.

When the operator wishes to jog the robot 2 by using the rotary dial-type operation device 7 connected to the robot controller 5, the operator switches the request switch 6*b* of the robot operation panel 6 to a non-request state, and switches the request switch 7*d* of the rotary dial-type operation device 7 to a position other than OFF so as to create a request state. Operation signals indicating the states of the request switches 6*b* and 7*d* are transmitted from the robot operation panel 6 and the rotary dial-type operation device 7 to the robot controller 5, and the operation right setting unit 53 provides the operation right to the rotary dial-type operation device 7.

Next, the operator operates the operation target setting unit 8 to set the operation target to the robot 2, selects the desired axis and the desired multiplying factor by operating the switches 7*c* and 7*d*, and depresses the enable switch 7*e* with the hand holding the casing 7*a*. The operation signals indicating the selected operation target, multiplying factor, and axis and the depression of the enable switch 7*e* are transmitted from the rotary dial-type operation device 7 to the robot controller 5.

Next, the operator rotates the pulse handle 7*b* in a desired direction by a desired amount of rotation. Operation signals including the pulses generated by the rotation of the pulse handle 7*b* are transmitted from the rotary dial-type operation device 7 to the robot controller 5.

In the robot controller 5, the operation signals are input from the receiver 51*a* to the signal processor 52. Since the operation target is set to the robot 2 and the operation right is provided to the rotary dial-type operation device 7, the operation signals are forwarded from the signal processor 52 to the operation right setting unit 53, and are further forwarded to the target position calculating unit 54. Next, in the target position calculating unit 54, the target position of the operation region of the robot 2 is calculated on the basis of the operation signals, and, in the drive command converter 55, a drive command signal for moving the operation region of the robot 2 to the target position is calculated. The drive command signal is transmitted from the robot controller 5 to the driving unit 2a of the robot 2. As the driving unit 2a is actuated according to the drive command signal, the operation region of the robot 2 moves to the target position in a direction along the selected direct drive axis or rotates to the target position about the selected rotary axis.

Here, even if the robot operation panel 6 is operated and the operation signals are input from the robot operation panel 6 to the robot controller 5, operation of the robot 2 through the robot operation panel 6 is forbidden by the operation right setting unit 53, and thus the robot 2 never moves according to the operation of the robot operation panel 6.

If another operator wishes to operate the robot 2 by using the robot operation panel 6, that other operator waits until the request switch 6b is switched to a request state and the request switch 7d is switched to a non-request state. When the request switch 7d is switched to the non-request state, the operation right shifts from the rotary dial-type operation device 7 to the robot operation panel 6, and then the robot 2 can be operated through the robot operation panel 6.

When the operator wishes to manually jog the machine tool 3, the operator operates the operation target setting unit 8 to set the operation target to machine tool 3, and, like in the case of jogging the robot 2, selects the desired axis and the desired multiplying factor by operating the switches 7c and 7d, depresses the enable switch 7e by the hand holding the casing 7a, and rotates the pulse handle 7b in a desired direction by a desired amount of rotation. In this manner, the operation signals are transmitted from the rotary dial-type operation device 7 to the robot controller 5.

In the robot controller 5, operation signals are input from the receiver 51a to the signal processor 52. Since the operation target is set to the machine tool 3, the operation signal is forwarded from the signal processor 52 to the transmitter 56, and is further forwarded from the transmitter 56 to the machine tool controller 4. In the machine tool controller 4, the operation signals are forwarded from the receiver 41 to the target position calculating unit 43 via the signal processor 42. Next, in the target position calculating unit 43, the target position of the operation region of the machine tool 3 is calculated on the basis of the operation signals, and, in the drive command converter 44, a drive command signal for moving the operation region of the machine tool 3 to the target position is calculated. The drive command signal is transmitted from the machine tool controller 4 to the driving unit 3a of the machine tool 3. As the driving unit 3a is actuated according to the drive command signal, the operation region of the machine tool 3 moves to the target position in a direction along the selected linear motion axis or rotates to the target position about the selected rotary axis.

If the operator wishes to jog the robot 2 by using the robot operation panel 6, the operator switches the request switch 7d of the rotary dial-type operation device 7 to a non-request state, i.e., OFF, and switches the request switch 6b of the robot operation panel 6 to a request state. Operation signals indicating the states of the request switches 6b and 7d are transmitted from the robot operation panel 6 and the rotary dial-type operation device 7 to the robot controller 5, and the operation right setting unit 53 shifts the operation right from the rotary dial-type operation device 7 to the robot operation panel 6.

Next, the operator depresses the operation key 6d or number key 6e while depressing the enable switch so as to jog the robot 2 or set the control parameters.

Here, even if the rotary dial-type operation device 7 is operated and the operation signals are input from the rotary dial-type operation device 7 to the robot controller 5, operation of the robot 2 through the rotary dial-type operation device 7 is forbidden by the operation right setting unit 53, and thus the robot 2 never moves according to the operation of the rotary dial-type operation device 7.

If another operator wishes to operate the robot 2 by using the rotary dial-type operation device 7, that other operator waits until the request switch 7d is switched to a request state and the request switch 6b is switched to a non-request state. When the request switch 6b is switched to a non-request state, the operation right shifts from the robot operation panel 6 to the rotary dial-type operation device 7, and then the robot 2 can be operated through the rotating dial-type operation device 7.

As such, according to the present embodiment, once the operation right is provided to the rotary dial-type operation device 7, the rotary dial-type operation device 7 continues to hold the operation right until the request switch 7d is switched to a non-request state. While the rotary dial-type operation device 7 holds the operation right, the robot controller 5 forbids operation of the robot 2 through the robot operation panel 6. In addition, even when the request switch 6b is switched to a request state or the enable switch of the robot operation panel 6 is depressed, the rotary dial-type operation device 7 will not be deprived of the operation right by the robot operation panel 6 or become unable to operate the robot 2. Thus, the operator can exclusively keep operating the robot 2 through the rotary dial-type operation device 7 until the request switch 7d is switched to a non-request state.

Similarly, once the operation right is provided to the robot operation panel 6, the robot operation panel 6 continues to hold the operation right until the request switch 6b is switched to a non-request state. While the robot operation panel 6 holds the operation right, the robot controller 5 forbids operation of the robot 2 through the rotary dial-type operation device 7. In addition, even when the request switch 7d is switched to a request state and the enable switch 7e of the rotary dial-type operation device 7 is depressed, the robot operation panel 6 will not be deprived of the operation right by the rotary dial-type operation device 7 or become unable to operate the robot 2. Thus, the operator can exclusively keep operating the robot 2 through the robot operation panel 6 until the request switch 6b is switched to a non-request state.

Furthermore, the present embodiment prevents operation of the robot 2 through two operation devices 6 and 7 simultaneously. In addition, when one operator is operating the robot 2 by using one of the operation devices 6 and 7, another operator is prevented from taking away the operation right by operating the other one of the operation devices 6 and 7, for example.

For the sake or argument, if it is possible to operate the robot 2 by an operator using the robot operation panel 6 while another operator is operating the robot 2 by using the rotary dial-type operation device 7, the robot 2 would perform motions that are not intended by the operator of the rotary dial-type operation device 7. Such a situation can be avoided according to the present embodiment.

When an operation device dedicated to the machine tool 3 is provided instead of the operation device 7 that serves both the robot 2 and the machine tool 3, the operator needs to learn how to use both the operation device 6 dedicated to the robot 2 and the operation device dedicated to the machine tool 3. In particular, for an operator that has been handling the robot 2, it is a great burden to have to learn a new operation method for the machine tool 3, and, vice versa, for an operator that has been handling the machine tool 3, it is a great burden to have to learn a new operation method for the robot 2. According to the present embodiment, the operator can easily learn the method for jogging both the robot 2 and the machine tool 3 by simply learning how to use the operation device 7.

In the present embodiment, the robot operation panel 6 may be further equipped with a notifying unit that notifies the operator whether the operation right is provided to the robot operation panel 6. Similarly, the rotary dial-type operation device 7 may be further equipped with a notifying unit that notifies the operator whether the operation right is provided to the rotary dial-type operation device 7.

In this case, the operation right setting unit 53 transmits a signal to the rotary dial-type operation device 7 via a transmitter (not illustrated) connected to the rotary dial-type operation device 7 when the operation right is provided or not provided to the rotary dial-type operation device 7. The notifying unit of the rotary dial-type operation device 7 sends a notification to the operator in response to the signal.

Furthermore, the operation right setting unit 53 transmits a signal to the robot operation panel 6 via a transmitter (not illustrated) connected to the robot operation panel 6 when the operation right is provided or not provided to the robot operation panel 6. The notifying unit of the robot operation panel 6 sends a notification to the operator in response to the signal.

One example of the notifying unit of the robot operation panel 6 is an operation screen 6c that indicates whether the operation right is provided. Another example of the notifying unit of the robot operation panel 6 is an LED lamp that lights or blinks to indicate that the operation right is provided to the robot operation panel 6.

One example of the rotary dial-type operation device 7 is an LED lamp 7g that lights or blinks to indicate that the operation right is provided to the rotary dial-type operation device 7.

In the present embodiment, the multiplying factor selection switch 7d doubles as the request switch; alternatively, a request switch of any desired type separate from the multiplying factor selection switch 7d may be installed in the rotary dial-type operation device 7.

In the present embodiment, the second operation device 7 can be connected to the machine tool controller 4 and the robot controller 5; alternatively, the second operation device 7 can be connected to only one of the machine tool controller 4 and the robot controller 5. In other words, the machine tool controller 4 need not have a connector 4a, or the robot controller 5 need not have a connector 5a.

In the present embodiment, the rotary dial-type operation device 7 can be used to operate the robot 2 and the machine tool 3; alternatively, the rotary dial-type operation device 7 can be used to operate only the robot 2.

In the present embodiment, the robot control system 1 is a part of the control system that includes the machine tool controller 4; alternatively, the robot control system 1 can be used alone.

In the present embodiment, the first operation device 6 is a robot operation panel, and the second operation device 7 is a rotary dial-type operation device; however, specific forms of the operation devices 6 and 7 are not limited to these, and the operation devices may be manual operation devices of any form that enables manual operation of the robot 2.

The invention claimed is:

1. A robot control system, comprising:
a robot controller configured to control a robot;
a first operation device configured to manually operate the robot, the first operation device connected to the robot controller; and
a second operation device configured to manually operate the robot, the second operation device connected to the robot controller,
wherein each of the first operation device and the second operation device has a request switch configured to switch between a request state in which an operation right for the robot is requested and a non-request state in which the operation right is not requested, and
the robot controller is configured to:
start providing the operation right to one of the first operation device and the second operation device only when the request switch of the one of the operation devices is in the request state and the request switch of the other of the operation devices is in the non-request state, allow the one of the operation devices that is granted the operation right to operate the robot and forbids the other of the operation devices from operating the robot while the operation right remains granted to the one of the operation devices, and
after the operation right is granted to the one of the operation devices, keep the operation right granted without an operation-right setting using a changeover switch which is provided in a device other than the first operation device and the second operation device until the request switch of the one of the operation devices is switched to the non-request state even when the request switch of the other of the operation devices is switched to the request state.

2. The robot control system according to claim 1, wherein the robot controller is connected to a machine tool controller configured to control a machine tool so that the robot controller can communicate with the machine tool controller,
the first operation device is a robot operation panel configured to operate only the robot, and
the second operation device is a rotary dial-type operation device configured to operate the robot and the machine tool.

3. The robot control system according to claim 1, wherein the first operation device includes a notifying unit that notifies an operator whether the operation right is provided to the first operation device.

4. The robot control system according to claim 3, wherein the notifying unit is a lamp or an operation screen.

5. The robot control system according to claim 1, wherein the second operation device includes a notifying unit that notifies an operator whether the operation right is provided to the second operation device.

* * * * *